D. C. MULVIHILL.
DETACHABLE RIM SPROCKET WHEEL.
APPLICATION FILED JAN. 31, 1916.
1,194,767.    Patented Aug. 15, 1916.
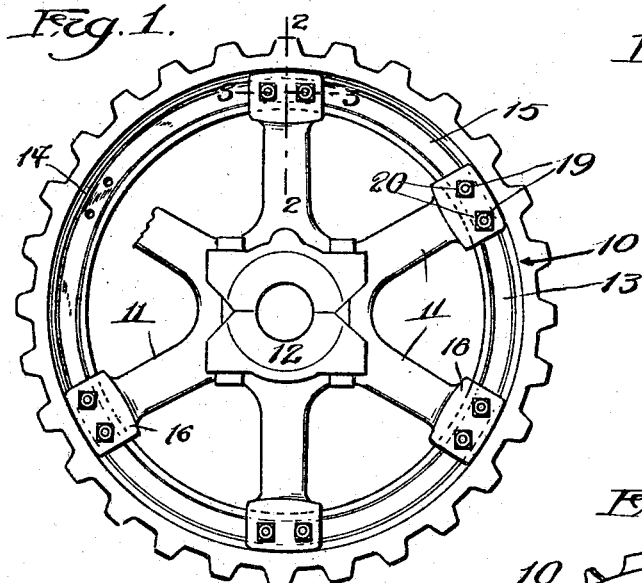
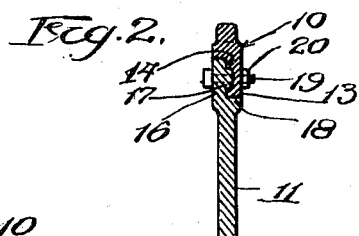
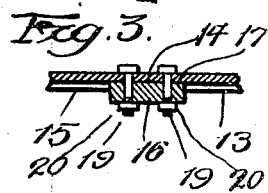
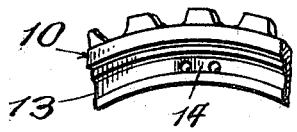
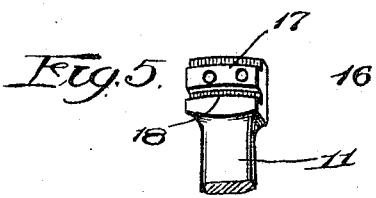
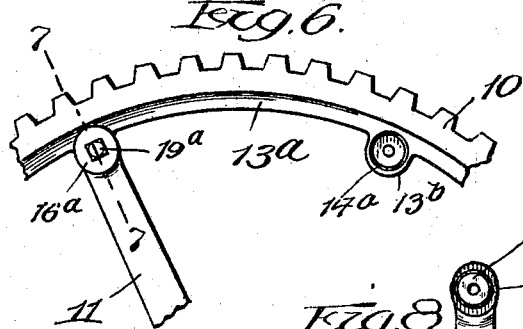
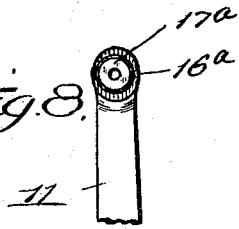
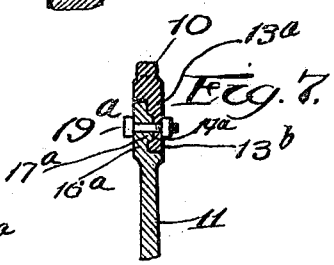
Inventor;
Daniel C. Mulvihill,
by Charles O. Shervey
his Atty.

UNITED STATES PATENT OFFICE.

DANIEL C. MULVIHILL, OF HANNIBAL, MISSOURI.

DETACHABLE-RIM SPROCKET-WHEEL.

1,194,767.  Specification of Letters Patent.  Patented Aug. 15, 1916.

Application filed January 31, 1916. Serial No. 75,260.

*To all whom it may concern:*

Be it known that I, DANIEL C. MULVIHILL, a citizen of the United States, and a resident of Hannibal, Marion county, and State of Missouri, have invented certain new and useful Improvements in Detachable-Rim Sprocket-Wheels, of which the following is declared to be a full, clear, and exact description.

This invention relates to detachable rim wheels, and has been designed more particularly for use in connection with sprocket wheels.

The principal objects of the invention are economy in the cost of manufacture and increased strength, there being no shrinkage strains on the spokes or rims when cast separately.

Another object is to provide a detachable rim sprocket wheel of novel construction, whereby the rim may be readily detached from the spokes, when worn or broken and thereafter replaced with a new one.

With these and other objects in view, this invention consists in the several novel features hereinafter fully described and particularly pointed out in the claims.

The invention is clearly illustrated in the accompanying drawing in which:—

Figure 1, is a side elevation of a simple form of detachable rim sprocket wheel, showing the preferred embodiment of the invention applied thereto; Fig. 2, is a detail cross section taken on line 2—2 of Fig. 1; Fig. 3, is a horizontal section taken on line 3—3 of Fig. 1; Fig. 4, is a perspective view of a fragment of the rim of the wheel; Fig. 5, is a perspective view of a fragment of one of the spokes; Fig. 6, is a side elevation of a fragment of a detachable rim sprocket wheel embodying a modified form of the invention; Fig. 7, is a detail cross section taken on the line 7—7; Fig. 6, and Fig. 8, is a side elevation of one of the spokes seen in Fig. 6, looking at the reverse side thereof.

Referring to said drawing, and first to Figs. 1, to 5, inclusive, 10, designates the detachable rim portion, 11, the spokes of the spoke portion, and 12, the hub of the wheel. The periphery of the rim portion is shown as formed with sprocket teeth as usual.

One face of the rim has an annular, sunken or depressed portion which leaves a radially extending annular web or rib 13, which is formed on its face 15, with an annular groove 14. The spokes 11, have off-set end portions 16, which bear against the face or side 15, of the web 13, and are cast with lugs 17, which fit in and seat in the groove 14. A shoulder 18, is formed at the place where the end portion of each spoke is off-set, which shoulder bears against the inner edge of the web 13, (see Fig. 2). Bolts 19, extend through registering bolt holes in the web 13 and end portions of the spokes and have nuts 20, secured on their threaded ends for fastening the rim portion and spoke portion together.

In the modified form of the invention illustrated in Figs. 6, 7, and 8, the web $13^a$, is formed with radially projecting ears $13^b$, lying in the plane of the web, and said web and ears are cast with sockets, $14^a$, circular in shape and having tapering or sloping sides. The end portions $16^a$, of the spokes are off-set as in the preferred form and have tapering sided circular lugs $17^a$ that project into and seat in the circular sockets $14^a$. A single bolt $19^a$ extends through each spoke and ear and has a nut threaded upon its end for securing the rim to the spokes.

It is to be observed, that a strong, substantial and durable wheel may be constructed in accordance with this invention, that the rim and spokes may be readily assembled and bolted together, that when the rim is worn out, or in case of breakage thereof, it may be readily detached from the spokes, by unscrewing the nuts and removing the bolts, after which a new rim may be attached to the spokes.

Slight variations of the details of construction are possible without departing from the spirit of this invention; I desire, therefore, not to limit myself to the exact forms of the invention shown and described, but intend in the following claims to point out all of the invention disclosed herein.

I claim as new and desire to secure by Letters Patent:

1. A detachable rim toothed wheel, comprising a rim portion and a spoke portion separated therefrom and lying in the plane thereof, said rim portion having recessed lug receiving portions in one face, and each spoke having a lug cast on one face thereof and adapted to seat in the recess of a lug receiving portion in the rim portion, and bolts extending through said lugs and recessed lug receiving portions of the rim.

2. A detachable rim sprocket wheel, comprising a rim portion and a spoke portion separated therefrom and lying in the plane thereof, said rim portion having an inwardly extending annular web formed with recessed lug receiving portions in one face, and each spoke being formed with a lug adapted to seat in a recess of the lug receiving portions of the web, and bolts extending through said recessed lug receiving portions and lugs.

3. A detachable rim sprocket wheel, comprising a rim portion and a spoke portion bolted together, said rim portion having an inwardly extending web formed with tapering sided sockets in one face, there being one socket for each spoke and each spoke being formed with an off-set end portion having a tapering sided lug adapted to be seated in a socket in the rim portion.

4. A detachable rim sprocket wheel, comprising a rim portion and a spoke portion lying in the plane thereof, said rim portion having an annular web formed with tapering sided sockets in one face and each spoke being formed with a shoulder adapted to engage the inner edge of said web, and also formed with an offset end portion having a tapering sided lug adapted to be seated in a lug receiving portion of the web, and bolts passing through said lug receiving portions of the web and through the lugs of the spokes.

DANIEL C. MULVIHILL.

Copies of this patent may be obtained for five cents each, by addressing the "Commissioner of Patents, Washington, D. C."